United States Patent [19]

Rzeszewski

[11] 4,335,396
[45] Jun. 15, 1982

[54] AUTOMATIC EQUALIZATION SYSTEM FOR TELEVISION RECEIVER

[75] Inventor: Theodore S. Rzeszewski, Lombard, Ill.

[73] Assignee: Matsushita Electric Corporation, Franklin Park, Ill.

[21] Appl. No.: 206,648

[22] Filed: Nov. 13, 1980

[51] Int. Cl.$^3$ .......................................... H04N 9/535
[52] U.S. Cl. .............................. 358/21 R; 358/21 V; 358/160; 358/905
[58] Field of Search ................. 358/21 V, 35, 160, 905

[56] References Cited

U.S. PATENT DOCUMENTS

| | | | |
|---|---|---|---|
| 3,755,617 | 8/1973 | Ichida | 358/21 V |
| 4,044,381 | 8/1977 | Shimano et al. | 358/160 |
| 4,127,874 | 11/1978 | Iwasawa et al. | 358/905 |
| 4,130,831 | 12/1978 | Isono et al. | 358/21 V |
| 4,285,006 | 8/1981 | Kurahashi et al. | 358/35 |

Primary Examiner—Richard Murray

Attorney, Agent, or Firm—LaValle D. Ptak

[57] ABSTRACT

An automatic equalization circuit for a television receiver utilizes a portion of the VIR signal appearing in the conventional composite television signal as the training signal for the equalization circuit. A transversal filter in the form of a charge coupled device (CCD) clocked by a voltage controlled oscillator is used as the delay line for the equalization circuit. The output taps of the CCD are coupled through analog multipliers which, in turn, are provided with an error signal produced by the comparison between a reference signal and the output of an adder circuit connected to the outputs of all of the analog multipliers to vary the outputs of the analog multipliers in accordance with an error signal produced by the comparison circuit. The system also replaces the usual luminance delay line of a color television receiver, and the center tap of the CCD provides the delay normally imparted to the luminance signal components in such a receiver.

8 Claims, 4 Drawing Figures

AUTOMATIC EQUALIZATION SYSTEM FOR TELEVISION RECEIVER

BACKGROUND OF THE INVENTION

Waveform distortions frequently occur in the signal transmission path of a composite television signal from a television signal transmitting station to a receiver. The transmission path includes the internal circuits of the television receiver receiving such a signal. These distortions are in the form of both amplitude and phase distortions and are observed in the reproduced picture at the receiver in the form of smearing, ringing, ghosts, etc. The distortion is highly undesirable since it directly affects the quality of the reproduced picture on the viewing screen of the television receiver, which, in extreme cases, can make viewing of the reproduced image an unpleasant experience.

The resultant distortion is produced by a variety of causes, which may include any one or all of: reflection of the transmitted signals by buildings, mountains, or other obstructions; impedence mismatching between the receiving antenna or cable and the television receiver; and any deviations within the receiver itself of the filters in the intermediate frequency amplifier circuit or the time delay circuit in the video section of the receiver. Any deviation in the characteristics of any of these potential sources of distortion from the ideal is likely to result in a degradation of the reproduced image in the television receiver. The degree of degradation of the image varies in accordance with the degree of distortion caused by any one or more of these possible sources of distortion.

It has been found that, in most cases, the distortion from any of the causes mentioned above is linear distortion rather than non-linear distortion. Consequently, it is possible to compensate for the waveform distortion by inserting into the television signal transmission path a filter which has a frequency characteristic which is a mirror image of or opposite to the characteristic which created the waveform distortion in the first place. In the past, systems for achieving this purpose have included a transversal filter and a reference signal generator controlled by a training signal located in the composite video signal for synchronizing the operation of the reference signal generator and the operation of the transversal filter. The reference signal then is compared with the received training signal and the result of the comparison is used to control the tap coefficients of the transversal filter for automatically compensating for the waveform distortion. A system for accomplishing automatic equalization in this manner is disclosed in the patent to Shimano and Aizawa, U.S. Pat. No. 4,044,381, issued Aug. 23, 1977. In the Shimano et al. patent, the training signal which is utilized to control the operation of the reference signal generator is obtained from the horizontal or vertical synchronizing signal or from an additional signal added to the video signal as a reference. The active video signal itself cannot be used as a reference because it changes continuously.

A problem which exists in using a portion of either the horizontal or vertical synchronizing signals is that, as is well known, such signals at this level are subject to many distortions which are not experienced by the active video signals. As a consequence, a system of the type disclosed in the Shimano et al patent will correct for distorted synchronization signals, but at the same time may actually distort the video. It is the video signal which is observed on the face of the picture tube and not the synchronization signals. Consequently, proposals have been made of inserting a special signal for utilization in waveform distortion correction, and one such signal also is disclosed in the Shimano et al. patent. The problem with utilizing any additional signal added to the already very complex composite television signal is that such new training signals usually are time division multiplexed into the vertical interval of the composite video. It is possible that these additional signals may result in visible interference on the screen of the television receivers. Even more significant, however, is that the space in the vertical interval where such additional signals may be placed is badly needed for proposed applications such as teletext data, bilingual sound, and the like. These latter potential uses of the limited available space have a higher priority than an additional signal usable only for equalization.

A system for correcting for linear distortion also is distinguishable from a system for removing ghost signals from received video signals. It has been shown that linear distortions can be considered to result from paired echoes which are closely associated with the main or desired response. When the paired echoes become widely removed from the main or desired response, they generally are considered as ghosts and appear as a spaced part second image on the television screen. Although linear distortion is in the form of paired echoes, television ghosts normally do not occur in pairs but instead appear in the form of multiple ghosts (more than pairs). Consequently, any solution to removing ghosts from a video signal requires a considerably more complex system and, particularly, requires a very long (high number of sections) transversal filter, or the like. A system using a transversal filter for ghost elimination in a television receiver is disclosed in the patent to Iwasawa et al., U.S. Pat. No. 4,127,874, issued Nov. 28, 1978. This patent is mentioned merely as typical of a ghost elimination system for a television receiver.

It is desirable to provide for a simplified automatic waveform equalization system for correcting for linear distortion in a television receiver which is capable of using signals already present in the composite television signal but which provides correction more closely related to the distortion of the video portion of the signal than the synchronizing signal portion. Furthermore, it is desirable to combine the functions of the linear distortion correction with other functions already present in the television receiver to reduce the overall cost of providing distortion correction or equalization.

SUMMARY OF THE INVENTION

Accordingly, it is an object of this invention to provide a system for compensating for waveform distortion.

It is another object of this invention to provide a system for automatically removing waveform distortion from the detected composite video signal in a television receiver.

It is an additional object of this invention to provide a simplified system for removing linear waveform distortion from the received signal in a television receiver.

It is a further object of this invention to provide an automatic waveform equalization system for a television receiver operated in response to the VIR signal component of the composite television signal.

It is yet another object of this invention to provide an improved linear distortion correction system for a color television receiver employing a common delay line for the distortion correction system and the luminance delay line of the receiver.

It is still a further object of this invention to provide an improved time domain automatic waveform equalization system for a television receiver.

In accordance with a preferred embodiment of this invention, an automatic equalization system for a television receiver utilizes the VIR signal component of the composite color television signal as a training signal to synchronize the generation of a reference signal having the same waveform characteristics. The reference signal and the VIR signal are compared to produce a resultant signal indicative of the waveform distortion, and this resultant signal is employed to control the tap coefficients of a transversal filter for automatically compensating for waveform distortion.

In a more specific embodiment, the transversal filter is a charge coupled device (CCD) operated by a clock oscillator synchronized with the VIR signal.

In an even more specific embodiment, the delay of the luminance signal components of the color television receiver are obtained from a tap of the transversal filter used for the waveform distortion correction, thereby eliminating the conventional luminance delay line from the receiver.

DETAILED DESCRIPTION

Figure 1:
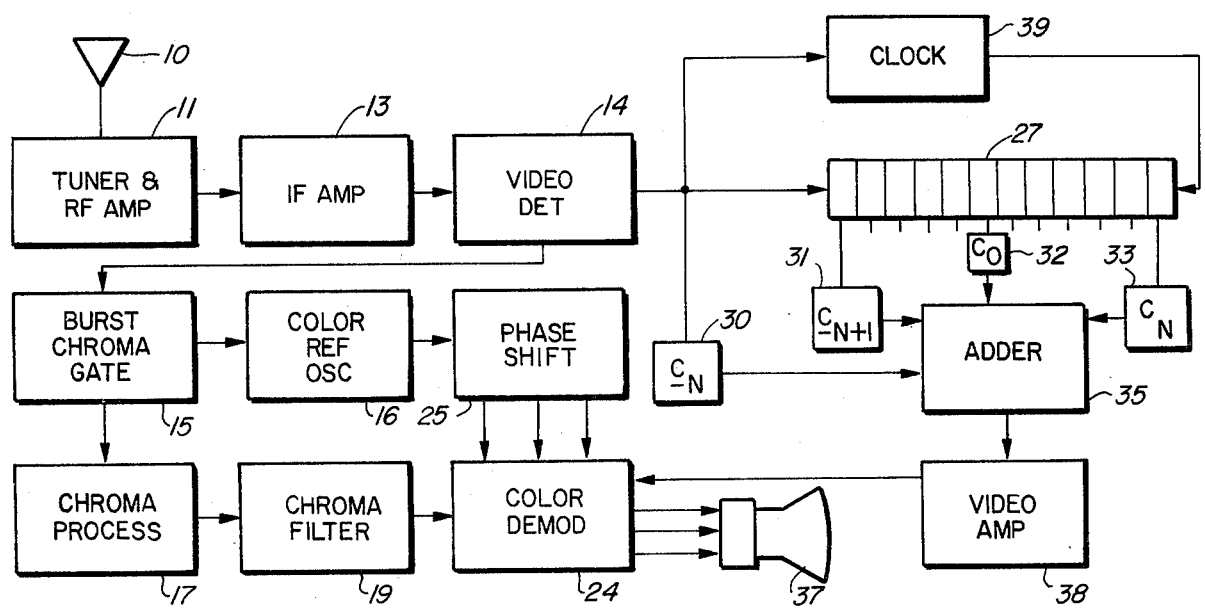
FIG. 1 is a block diagram of a preferred embodiment of the invention.

Reference now should be made to the drawings where the same reference numbers are used throughout the several figures to designate the same or similar components. FIG. 1 is directed to a block diagram of a portion of a television receiver which has been modified to incorporate the automatic equalization system or automatic waveform distortion correction system of the invention.

In the system shown in FIG. 1, composite television signals are received on antenna 10 and are applied through a tuner and RF amplifier stage 11, which produces the conventional intermediate frequency (IF) signals for the television receiver. These IF signals are amplified by an IF amplifier 13, which applies them to a video detector stage 14. The video detector has outputs coupled with a burst/chroma gate circuit 15, outputs of which are used to synchronize the operation of the color reference oscillator 16 and the chroma processing circuit 17 of the receiver. The output of the chroma processing circuit 17 is passed through a chroma filter 19 to a color demodulator circuit 24; and the output of the color reference oscillator 16 is applied to a conventional phase shifting circuit 25, which produces the reference signal at the three desired phases on its output for operation of the color demodulator circuit 24. The manner in which these circuits operate is well known and need not be described in any greater detail here.

The output of the video detector 14, which comprises the luminance signal components, is applied to a multi-stage filter circuit 27, which replaces the conventional video delay line normally used in a television receiver. Various stages of the filter circuit 27 are connected through tap coefficient adjusting circuits, four of which, 30, 31, 32 and 33, are shown in FIG. 1. The outputs of all of the tap coefficient adjusting circuits are connected to an adder circuit 35. The resultant signal appearing on the output of the adder 35 is applied through a video amplifier circuit 38, of the type commonly found in television receivers, from which the amplified luminance signal is supplied to the color demodulator circuit 24, where it is combined with the color difference signals to produce the output signals used to drive the color picture tube 37 of the television receiver.

As illustrated in FIG. 1, the filter 27 is a multi-stage charge coupled device (CCD) which requires clock pulses to shift the signals applied to its input stepwise through the stages of the filter. Synchronization of the operation of the filter 27 with the input signal waveform is accomplished by means of a clock circuit 39, which responds to the trailing edge of the VIR signal present in the output signals supplied from the video detector circuit 14. The manner in which this is accomplished is described in greater detail subsequently.

The circuit of FIG. 1 differs from a conventional television receiver circuit in the substitution of the transversal filter 27, the coefficient adjusting circuits 30, 31, 32, 33, the adder circuit 35, and the clock circuit 39 for the conventional simple video delay normally employed between the output of the video detector 14 and the video amplifier 38. These additional circuit components are utilized to perform the dual function of the conventional video delay and automatic elimination of linear waveform distortion of the received signal transmitted through the transmission path from the transmitting station and the internal circuits of the television receiver through the video detector 14.

Figure 2:
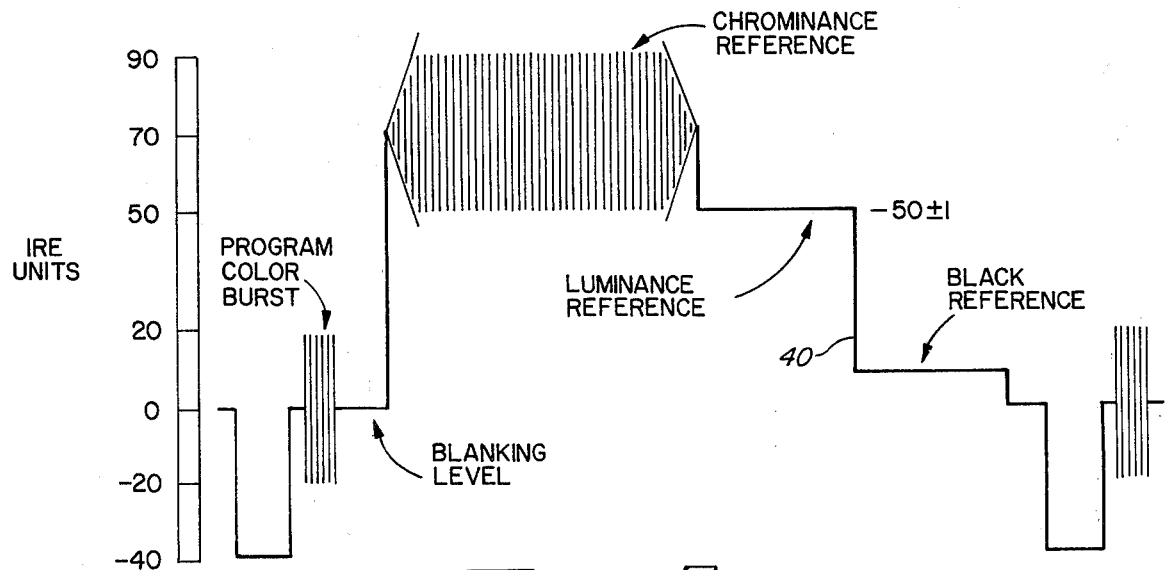
FIG. 2 is an enlarged waveform of the VIR signal component of the composite color television signal received by the system shown in FIG. 1.

As stated previously, the waveform distortion correction of the circuit shown in FIG. 1 is controlled by a training signal in the form of the VIR signal already present in the composite television signal for the purpose of color control. FIG. 2 illustrates the composition of the standard VIR signal, and reference should be made to that Figure for an understanding of the manner in which the signal is used in conjunction with the automatic equalization or distortion correction system shown in FIGS. 1, 3 and 4.

The VIR signal, which is shown in FIG. 2, now is inserted at the transmitting station on line 19 of both television fields. It is a tightly controlled signal and has a peak to peak variation of any nominally constant level of 0.5 IRE units maximum. As shown in FIG. 2, the range of signal level of this signal varies from minus 40 IRE units to plus 90 IRE units (the maximum peaks of the chominance reference). The chrominance reference phase is selected to be the same as the program color burst with a minimum amount of harmonic distortion. As seen in FIG. 2, the program color burst is inserted on the blanking level at the beginning of the VIR signal. This is followed by the chrominance reference which is of 24 microseconds duration. Immediately following the chrominance reference is a flat luminance reference at 50 IRE units, which lasts for 12 microseconds. The signal then has a sharp falling edge 40 from the VIR luminance reference level that goes from 50 IRE units to the black reference level of 7.5 IRE units. This is a 42.5 IRE unit negative-going edge which is located at a voltage level representative of the video level in the composite television signal. Accordingly, this signal transition 40 undergoes amplitude and phase distortion which is comparable to the distortion suffered by the active video portions of the composite signal. This is in direct contrast to the horizontal sync and vertical sync serrations which are not located at a voltage level comparable to the video voltage level. This negative-going transition also is followed by a black reference level of 12 microseconds duration; so that the transition 40 stands alone in the VIR signal interval and is easy to identify and utilize. Consequently, the signal transition 40 is selected as the training signal for operating the automatic equalization or waveform distortion correction circuitry of the system shown in FIGS. 1, 3 and 4.

Any one of a number of known automatic equalization algorithms may be used. The incremental approach is utilized in the circuits shown in FIGS. 1, 3 and 4, however, because of its relative simplicity compared to other approaches. The system, however, does require accurate timing. The sytem shown in greater detail in FIG. 3, however, accomplishes the timing requirements by making the transversal filter 27 a charge transfer device (CTD) and, more specifically, by making the filter 27 in the form of a charge coupled device (CCD). The clock 39 (FIG. 1), which steps the input signals applied to the CCD 27 through it, includes a variable voltage controlled oscillator (VCO) preferably in the form of a variable crystal oscillator 42.

Fine frequency adjustments for the frequency of operation of the oscillator 42 are provided by the output signals supplied to its control input from a timing error detecting circuit 44. This circuit, in turn, has its output voltage controlled by output pulses supplied from a timing circuit 46, which responds to the falling edge 40 of the VIR luminance reference signal 40, discussed above. The manner in which the timing circuit is controlled to respond to this edge is comparable to the manner of operation of the synchronizing pulse separation circuit of a standard television receiver. Application of timing pulses from the circuit 46 to the timing error detecting circuit 44 causes the output voltage of the circuit 44 to vary accordingly. As a result of this interrelationship between the VIR signal and the frequency of operation of the voltage controlled oscillator 42, a fine timing adjustment for the operation of the transversal filter 27 is accomplished, since the delay of the CCD filter circuit 27 is inversely related to the frequency of operation of the oscillator 42.

Figure 4:
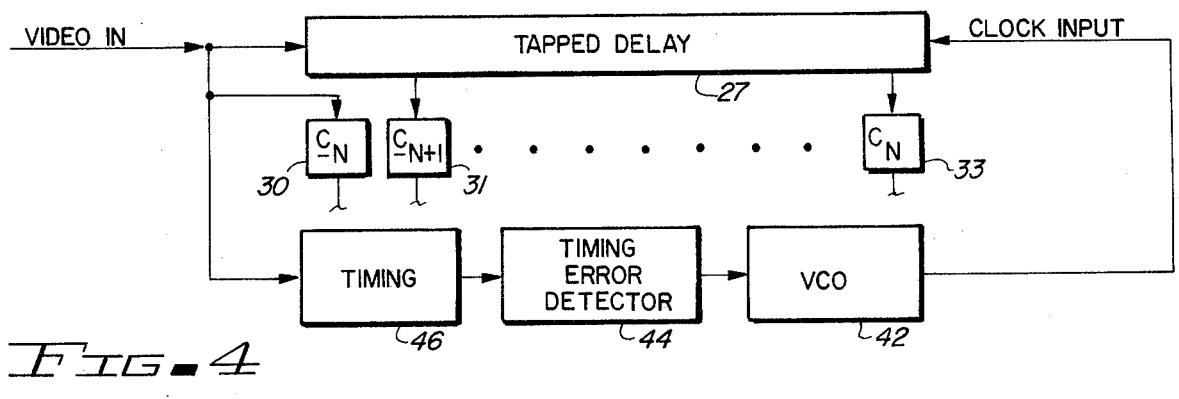
FIG. 4 is a block diagram of another portion of the system shown in FIG. 1 to illustrate additional details of the preferred embodiment.
Figure 3:
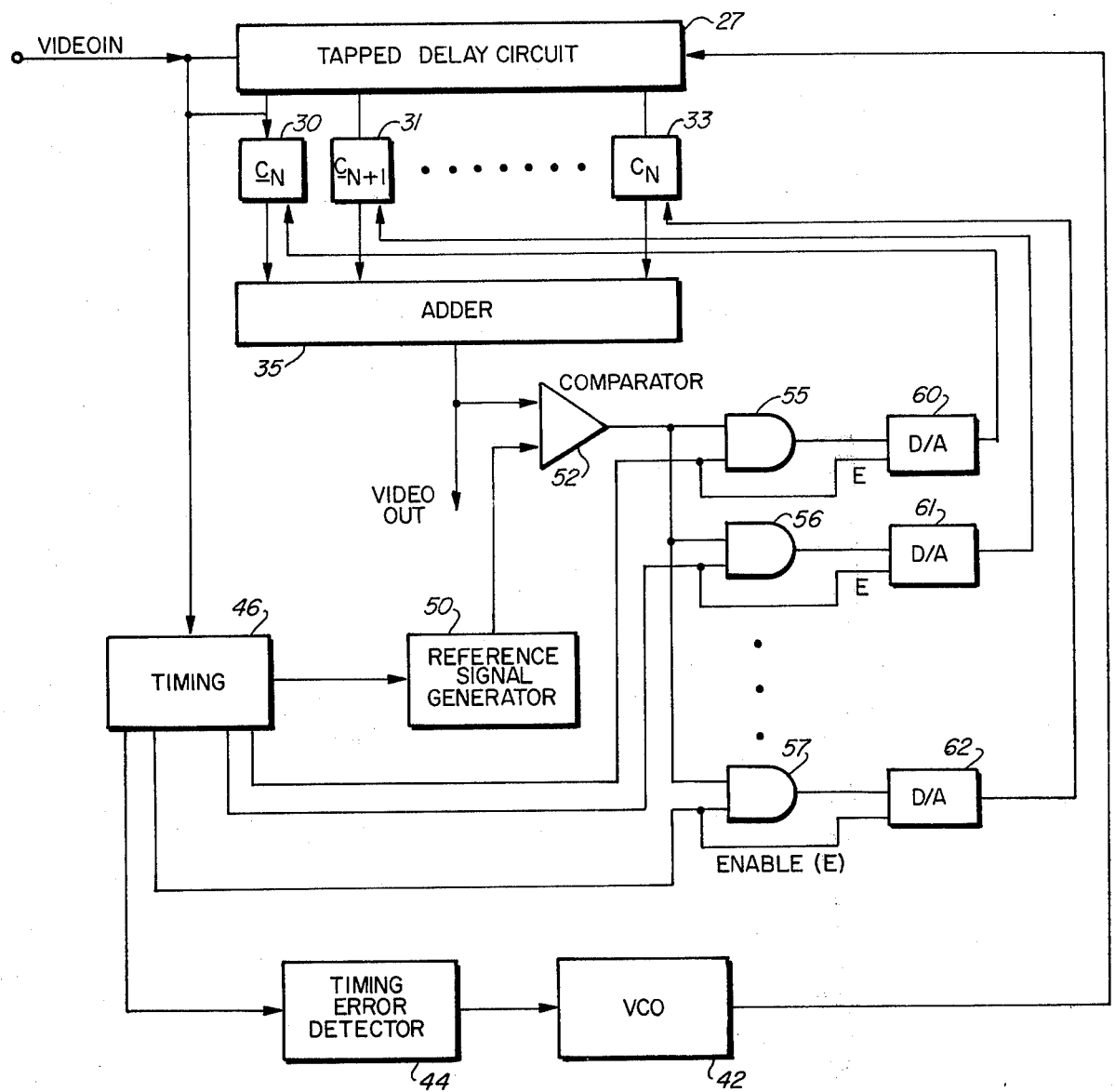
FIG. 3 is a block diagram of a portion of the system shown in FIG. 1, illustrating such portion in greater detail.

The tapped delay circuit 27, as shown in FIGS. 1, 3 and 4, is illustrated as a twelve section CCD circuit. Voltage controlled oscillator 42 is operated at a 10 Mhz rate; so that a 0.1 microsecond delay occurs for each stage of the delay circuit 27. Consequently, the center tap (the sixth stage) has a delay of 6×0.1 Mhz or 0.6 microseconds of delay. This represents the delay normally realized by the video signal with the conventional video delay line in a color television receiver.

The use of this center tap as the normal video delay accomplishes several things. First of all, by eliminating the conventional video delay and employing the transversal filter 27 to provide this output as well as the distortion correction outputs reduces the additional costs which must be added to the television receiver to provide the distortion correction feature. In addition, the distributed delay lines normally used in conventional television receivers usually introduce a significant distortion of their own, whereas the CCD type of delay line used for the circuit 27 has minimal distortion. Although a distributed delay line of twice the normal length of the one normally used in a television receiver with appropriate taps could provide the functions necessary for the transversal filter, the CCD type of filter shown and described is preferred because distortion effects normally are encountered by distributed delay lines and such lines do not have the possibility for the fine tuning adjustment which is accomplished by utilizing the oscillator 42, controlled as described above, to step the CCD delay circuit 27.

Output taps from the twelve stages of the circuit 27 are coupled to tap coefficient adjusting circuits 30, 31, 32 and 33, as described previously. The maximum number of taps for the delay circuit which is shown in the drawings is twelve, but not all of these taps need to be employed in the operation of the system. It is apparent, however, that with an increase in the number of tap coefficient adjusting circuits which are utilized, the equalized waveform approaches more closely the desired or exact waveform for ideal operation of the television receiver. The output signals provided from the coefficient adjusting circuits 30 through 33 are applied to the adder 35, where they are added together to produce a resultant output signal labeled as "video out" in FIG. 3. This is the signal which is applied to the input of the video amplifier 38 (FIG. 1) as the distortion corrected video signal for utilization by the remainder of the television receiver in producing images on the screen of the cathode ray tube 37.

The timing circuit 46 extracts a timing signal from the luminance to black reference signal transition 40 of the VIR signal as it appears on line 19 of each television field. This produces a synchronizing pulse to the timing error generator 44 and a trigger pulse to a reference signal generator 50, which produces a reference signal transition which has the same waveform characteristics as the luminance to black reference signal transition 40 of the VIR signal. The signal produced by the signal generator 50, however, has the ideal waveform which should be transmitted in the VIR signal; and this signal is applied to one input of a two input comparator circuit 52, which has its other input coupled to the output of the adder 35. When no distortion is present, these two input signals are identical. When distortion is present, however, the output of the comparator circuit 52 is directly in proportion to the distortion and its magnitude. This output then is applied to the inputs of a plurality of coincidence gate 55, 56 and 57, equal in number to the number of coefficient adjusting circuits 30 through 33. Each of the gates 55 through 57 also is uniquely associated with the corresponding one of the adjusting circuits 30 to 33.

The error signal appearing on the output of the comparator 52 is applied in common to one input terminal of all of the gates 55 through 57. The gates, in turn, are enabled sequentially by outputs from the timing circuit 46 to cause appropriate control error signals to be applied through the appropriate outputs of the gates 55 through 57 to respective digital to analog converter circuits 60, 61 or 62, associated with each of the gates 55, 56 and 57.

The timing signals from the timing circuit 46 are such as to enable the AND gates 55 through 57 sequentially at precisely the correct time when the output from the comparator 52 is representative of the polarity of the error between the video output of the adder 35 and the reference signal from the signal generator 50. If the output of the comparator 52 is positive when the gate 55 and the converter 60 are enabled by an output from the timing circuit 46, the converter 60 receives a positive output from the gate 55 and increments by a preestablished stepped amount to the next higher level output. If the polarity of the signal from the output of the comparator 52 is negative at the time the gate 55 and the converter 60 are enabled by the timing circuit 46, the output of the gate 55 is low, which causes the digital to analog converter 60 to step downward or decrement the output voltage to the next lower preestablished fixed level to provide the output signal for the coefficient adjusting circuit 30.

The outputs of the circuits 60, 61 and 62 then are applied as control inputs to the coefficient adjustment circuits 30, 31 and 33, which are in the form of analog gate multipliers, where the control signals are multiplied by the respective output signals appearing on the taps of the delay circuit 27 connected to their respective inputs. The signals which are obtained from the circuits 60, 61 and 62 constitute the error signal unique to each of the output taps of the delay circuit 27; so that each of the individual tap coefficient adjusting circuits 30 through 33 are controlled in accordance with the error signal derived from the comparator 52 and automatic control of these circuits is carried out to reduce that error signal to zero. As a consequence, the output signal which appears on the output of the adder 35 has been corrected of linear waveform distortion. The digital to analog converters 60 through 62 have a finite increment size as they are operated on a step-by-step basis in response to each enabling pulse applied to them from the timing circuit 46, as described above. Consequently, the error or distortion cannot be perfectly cancelled, in general, with the incremental algorithm illustrated. The system which is shown and which has been described does reduce the distortion to a considerable degree causing it to be nearly totally corrected. There also are some practical considerations which may make it desirable to use the derivative of the edge 40 of the waveform shown in FIG. 2, coupled with the use of the same shaped waveform from the reference signal generator 50, shown in FIG. 3.

By using the VIR signal as a reference or training pulse, a unique reference signal is employed which maximizes the waveform distortion correction that can be accomplished by the system without requiring the introduction of any new training signals to the composite video signal. At the same time, when the CCD transversal filter circuit 27 is employed, the final adjustment of the timing accomplished by means of the variable crystal oscillator 42 permits very accurate adjustment of the system operation. In addition, the utilization of the center segment of the transversal filter 27, as described above, permits elimination of the usual luminance delay line in the color television receiver for additional economy in the construction of the system.

The system which has been described above also may be implemented using microcomputer control in place of the hard wired circuit components shown in FIGS. 3 and 4. In addition to the foregoing advantages of the system, it also is possible to use the two taps of the filter 27 directly adjacent both sides of the center tap for peaking. This amounts to a high frequency boost to improve the rise time of the transients for video. The use of this type of peaking is usually accomplished by a separate two section delay line and is called aperture peaking. It is used as an example of the best approach to peaking because it does not introduce any phase distortions of its own in the process of providing peaking.

The foregoing description of the preferred embodiment of the invention is to be considered illustrative only. Various changes and modifications will occur to those skilled in the art without departing from the true scope of the invention. For example, the utilization of microcomputer control instead of the hard wired circuitry shown. In addition, the particular location of the gates 55, 56 and 57 relative to the output of the comparator and the control inputs to the tap coefficient adjusting circuits 30, 32 and 33 also may be varied without departing from the concept of the invention which has been illustrated. Also, the derivative of the edge 40 of the waveform of FIG. 2 may be used rather than using the edge 40 directly.

I claim:

1. An equalization circuit for a television receiver for automatically compensating for linear waveform distortion occurring in the composite television signal, which includes a VIR reference signal as a part thereof, said circuit including in combination:
    transversal filter means having an input and including delay means with a plurality of output taps for providing output signals at successively increased delay times with predetermined time intervals between them;
    reference signal generating means for generating a reference signal corresponding to a predetermined portion of said VIR signal and having the same characteristics as such predetermined portion of said VIR signal as originally transmitted;
    timing means responsive to said received television signal and coupled with said reference signal generating means for causing the reference signal generated thereby to be generated with the same timing as said predetermined portion of said VIR signal in the received composite television signal;
    means for applying the received composite television signal to the input of said filter means and to said timing means;
    a plurality of adjustment circuit means coupled to the respective output taps of said transversal filter means for controlling predetermined characteristics of the signals applied thereto from said transversal filter means;
    adder circuit means with a plurality of inputs coupled with the outputs of said adjustment circuit means for adding together the signals from said adjustment circuit means to produce a combined signal on an output thereof;
    comparison circuit means coupled with the output of said adder circuit means and the output of said reference circuit generating means for producing an error signal representative of the difference between the input signals applied thereto; and
    means coupling said comparison circuit means with said plurality of adjustment circuit means for varying the outputs thereof corresponding to the characteristics of the error signal produced from said comparison circuit means.

2. The combination according to claim 1 wherein the television receiver is a color television receiver and said transversal filter means has a delay means equal to twice the delay imparted to the video signal in a color television receiver and wherein the center tap of said delay means represents the delay realized by the video signal components of said composite television signal.

3. The combination according to claim 1 wherein said adjustment circuit means comprise analog multiplier circuit means.

4. The combination according to claim 1 wherein said transversal filter means comprises a charge transfer device.

5. The combination according to claim 4 wherein said charge transfer device comprises a charge coupled device and further including clock means synchronized with the composite video signal applied to the input of said charge transfer device for operating said device.

6. The combination according to claim 5 wherein said clock includes a voltage controlled oscillator means and a control circuit for said oscillator producing a control voltage for said voltage controlled oscillator means which varies in accordance with the phase of said predetermined portion of said VIR signal in the received composite television signal waveform.

7. The combination according to claim 6 wherein said adjustment circuit means comprise analog multiplier circuit means.

8. The combination according to claim 7 wherein the television receiver is a color television receiver and said transversal filter means has a delay means equal to twice the delay imparted to the video signal in a color television receiver and wherein the center tap of said delay means represents the delay realized by the video signal components of said composite television signal.

* * * * *